United States Patent
Bialon et al.

(10) Patent No.: US 10,471,942 B2
(45) Date of Patent: Nov. 12, 2019

(54) VALVE UNIT FOR MODULATING PRESSURE IN A COMPRESSED-AIR BRAKE SYSTEM

(71) Applicant: WABCO EUROPE BVBA, Brussels (BE)

(72) Inventors: Rafal Bialon, Olawa (PL); Andreas Teichmann, Isernhagen (DE)

(73) Assignee: WABCO Europe BVBA, Brussels (BE)

( * ) Notice: Subject to any disclaimer, the term of this patent is extended or adjusted under 35 U.S.C. 154(b) by 0 days.

(21) Appl. No.: 15/777,849

(22) PCT Filed: Nov. 7, 2016

(86) PCT No.: PCT/EP2016/001838
§ 371 (c)(1),
(2) Date: May 21, 2018

(87) PCT Pub. No.: WO2017/102043
PCT Pub. Date: Jun. 22, 2017

(65) Prior Publication Data
US 2018/0345926 A1    Dec. 6, 2018

(30) Foreign Application Priority Data

Dec. 15, 2015 (DE) .................. 10 2015 016 265

(51) Int. Cl.
*B60T 13/26* (2006.01)
*F16K 7/17* (2006.01)
(Continued)

(52) U.S. Cl.
CPC .............. *B60T 8/3605* (2013.01); *F16K 7/17* (2013.01); *F16K 31/1262* (2013.01);
(Continued)

(58) Field of Classification Search
CPC ........ B60T 8/342; B60T 8/362; B60T 8/3605; B60T 8/3675; B60T 13/26
(Continued)

(56) References Cited

U.S. PATENT DOCUMENTS 3,511,475 A * 5/1970 Pfau .......................... F16K 1/36
251/333
3,977,734 A    8/1976 Ronnhult et al.
(Continued)

FOREIGN PATENT DOCUMENTS

DE    2821136 A1    11/1979
DE    2713599 C2    12/1988
(Continued)

OTHER PUBLICATIONS

German Search Report from corresponding German application No. 2015P00082DE dated Nov. 23, 2016 (7 pages).
(Continued)

*Primary Examiner* — Christopher P Schwartz
(74) *Attorney, Agent, or Firm* — Brinks Gilson & Lione (57) ABSTRACT

A valve unit for modulating pressure in a compressed-air brake system comprises an inlet valve (6) and an outlet valve (7) configured as diaphragm valves, a brake pressure output (4) configured to be connected to or shut off from a brake pressure input (3) or a vent output (5), two pilot valves (8, 9) configured as 3/2-way solenoid valves, and a respective control chamber (31, 32) adjacent to the diaphragm (17, 18) of the diaphragm valves (6, 7). The diaphragms (17, 18) are each clamped between two housing parts (11, 14; 11', 14') via a respective ring bead (22, 23) placed in a housing-side ring groove (20, 21; 20', 21'). In order to avoid damaging the diaphragms (17, 18), an annular continuous or partially interrupted recess (54) is arranged in the ring groove (20, 21)

(Continued)

or immediately adjacent to the ring groove to receive displaced bead material from the diaphragm (17).

11 Claims, 12 Drawing Sheets

(51) Int. Cl.
    *B60T 8/36*         (2006.01)
    *F16K 31/126*     (2006.01)
    *B60T 8/50*         (2006.01)

(52) U.S. Cl.
    CPC ........... *F16K 31/1266* (2013.01); *B60T 8/362* (2013.01); *B60T 8/5037* (2013.01)

(58) Field of Classification Search
    USPC .... 188/73.44, 73.45; 303/40, 50, 54, 80, 82, 303/118.1, 119.1–119.3; 137/596.16–596.18, 627.5; 251/129.15, 251/333; 277/641
    See application file for complete search history.

(56) References Cited

U.S. PATENT DOCUMENTS

| | | | | |
|---|---|---|---|---|
| 4,311,317 | A * | 1/1982 | Bartels | A61M 16/16 220/304 |
| 5,131,667 | A * | 7/1992 | Mong | F16J 15/062 277/613 |
| 8,672,421 | B2 | 3/2014 | Eidenschink et al. | |
| 9,637,099 | B2 * | 5/2017 | Eidenschink | B60T 8/3605 |
| 10,011,253 | B2 * | 7/2018 | Knoke | B60T 8/3605 |
| 2004/0036233 | A1 * | 2/2004 | Schleth | F16J 15/061 277/641 |

FOREIGN PATENT DOCUMENTS

| | | |
|---|---|---|
| DE | 69517380 T2 | 10/2000 |
| DE | 102008028440 A1 | 12/2009 |
| DE | 102008035372 A1 | 2/2010 |
| DE | 102013202913 A1 | 8/2013 |
| EP | 0498584 A1 | 8/1992 |

OTHER PUBLICATIONS

International Search Report from corresponding PCT application No. PCT/EP2016/001838 dated Jan. 24, 2017 (8 pages).

\* cited by examiner

VALVE UNIT FOR MODULATING PRESSURE IN A COMPRESSED-AIR BRAKE SYSTEM

TECHNICAL FIELD

The invention concerns a valve unit for modulating pressure in a compressed-air brake system, with an inlet valve and an outlet valve configured as diaphragm valves, and via which a brake pressure output can be connected to or shut off from a brake pressure input or a vent output, and with two pilot valves configured as 3/2-way solenoid valves, via which a respective control chamber adjacent to the diaphragm of the assigned diaphragm valve can be pressurized with a control pressure via a control pressure line, wherein the diaphragm valves are arranged with parallel actuation axes and radially adjacent to each other in a valve housing, and the diaphragms of the diaphragm valves are each clamped between two housing parts via a respective ring bead laid in a housing-side ring groove and oriented axially on the pilot valve side.

BACKGROUND

In compressed-air brake systems of wheeled vehicles, such as motor vehicles and rail vehicles, valve units of the above-mentioned type may be used as brake valves, as relay valves, and as ABS control valves. Such a valve unit has an inlet valve and an outlet valve. Via the inlet valve, a brake pressure output, to which a brake circuit or a brake line leading to a wheel brake cylinder can be connected, can be alternately connected to or shut off from a brake pressure input, to which a brake line coming from a brake valve or relay valve can be connected. Via the outlet valve, the brake pressure output can be alternately connected to or shut off from a vent output which normally leads via a silencer to the environment.

Because of the large volume flows to be switched and correspondingly large flow cross-sections to be opened and closed, the inlet valve and outlet valve are often configured as pneumatically actuatable diaphragm valves, which can be controlled via a respective pilot valve configured as a 3/2-way solenoid valve. A diaphragm valve has a largely circular, disk-like, flexible diaphragm which at its edge is clamped in the valve housing, usually via a ring bead placed in a housing-side ring groove and oriented axially on the pilot valve side, i.e. axially facing the housing part containing the pilot valves.

On the axial inner side of the diaphragm on which the flow channels connected to the compressed air inputs and outputs are arranged, and coaxially to the actuation axis of the respective diaphragm valve, a cylindrical central channel with a circular valve seat facing the diaphragm and an outer ring channel concentric thereto are arranged. On the axially opposite outer side of the diaphragm, a control chamber is arranged which can be pressurized by the assigned pilot valve alternately with a high control pressure normally taken from the brake pressure input, or with a low control pressure, normally corresponding to ambient pressure, taken from the vent output or another point.

When the control chamber is pressurized with the high control pressure, the diaphragm is pressed against the valve seat, whereby the central channel is shut off from the outer ring channel, which corresponds to the closed state of the diaphragm valve concerned. When the control chamber is pressurized with the low control pressure, the diaphragm, which lies automatically on the valve seat due to its shaping and/or a valve spring, is raised from the valve seat by the brake pressure prevailing in the flow channels and displaced in the direction towards the control chamber, whereby the central channel is connected to the ring channel, which corresponds to the open state of the diaphragm valve concerned.

With regard to the geometric arrangement of the compressed air inputs and outputs of the inlet and outlet valves formed as diaphragm valves, and the pilot valves formed as solenoid valves, in a valve housing, valve units are known in which the compressed air inputs and compressed air outputs and diaphragm valves are arranged with parallel actuation axes in a first housing part, while the pilot valves are arranged in a second housing part, and in which the diaphragms of the diaphragm valves are each clamped between two housing parts via a respective ring bead placed in a housing-side ring groove and axially facing the housing part containing the pilot valves.

Such a valve unit is described for example in U.S. Pat. No. 3,977,734 A. In this known valve unit, a valve housing is divided into a lower housing part and an upper housing part via a separating plane which is horizontal in the installation position. The brake pressure input, the brake pressure output and the vent output are arranged in the lower housing part. The pilot valves are arranged in the upper housing part with mutually parallel actuation axes oriented perpendicularly to the separating plane. The diaphragm valves are arranged in the lower housing part with parallel actuation axes, wherein the diaphragms are clamped between the lower housing part and the upper housing part in a common diaphragm plane largely corresponding to the separating plane.

In a further such valve unit known from EP 0 498 584 B1, the valve housing is divided into an input housing and an output housing with a separating plane which is vertical in the installation position. The brake pressure input is indeed arranged in the input housing, but connected directly via a connecting channel to an input channel located in the output housing. The brake pressure output and the vent output are arranged directly in the output housing. The pilot valves with parallel actuation axes are combined in a valve block which is inserted in sealed fashion in a recess of the input housing. The diaphragm valves with parallel actuation axes are arranged in the output housing, wherein the diaphragms are clamped between the input housing and the output housing in a common diaphragm plane largely corresponding to the separating plane.

Finally, U.S. Pat. No. 8,672,421 B2 describes a valve unit in which a valve housing is divided into a lower housing part, an upper housing part and an intermediate plate arranged in between, with separating planes which are largely horizontal in the installation position. The brake pressure input, the brake pressure output and the vent output are arranged in the lower housing part. The pilot valves are arranged in the upper housing part with mutually parallel actuation axes oriented perpendicularly to the separating plane between the intermediate plate and the housing upper part, and with the same actuation direction, wherein the valve seats are part of the intermediate plate. The diaphragm valves with parallel actuation axes are arranged in the lower housing part, wherein the diaphragms are clamped between the lower housing part and the intermediate plate in a common diaphragm plane largely corresponding to the separating plane between the lower housing part and the intermediate plate.

The ring beads of the diaphragms usually have a slight oversize in relation to the ring grooves which are stationary relative to the housing, in order to guarantee a mechanically stable and pressure-tight clamping of the diaphragms between the respective housing parts. Due to this clamping, however, the bead material of the diaphragms consisting of an elastomer plastic is necessarily displaced radially inwardly out of the ring groove, which leads to local thickening and bulging of the diaphragms. As well as possible function disruption, these usually irregular deformations may also lead to tearing of the diaphragms and hence to premature failure of the diaphragm valves.

SUMMARY OF THE INVENTION

The invention is therefore based on the object of proposing a valve unit of the type disclosed initially in which damage of the diaphragms due to clamping of the ring beads is largely avoided.

This object is achieved by the valve unit for modulating pressure in a compressed-air braking system, which comprises an inlet valve and an outlet valve configured as diaphragm valves, and via which a brake pressure output can be connected to or shut off from a brake pressure input or a vent output. The valve unit also comprises two pilot valves configured as 3/2-way solenoid valves, via which a respective control chamber adjacent to the diaphragm of the assigned diaphragm valve can be pressurized with a control pressure via a control pressure line and hence the assigned diaphragm valve can be actuated, i.e. closed or opened. To simplify production and installation, the diaphragm valves are arranged with parallel actuation axes and radially adjacent to each other in a valve housing, and the diaphragms of the diaphragm valves are each clamped between two housing parts via a respective ring bead placed in a housing-side ring groove and oriented axially on the pilot valve side.

To achieve the stated object with this valve unit, it is also provided that an annular continuous or partially interrupted recess is arranged in the ring groove or immediately adjacent to the ring groove of at least one diaphragm valve, to receive displaced bead material from the diaphragm concerned.

Since the ring beads of the diaphragms are usually configured with a slight oversize in relation to the ring grooves on the housing side, the bead material displaced by the clamping between the housing parts can now escape into the recess and is no longer pressed radially inwardly into the flow channel of the respective diaphragm valve. Thus local thickening and bulging of the diaphragms, which could lead to tearing of the diaphragms and hence to a premature failure of the diaphragm valves, are avoided with relatively little cost.

According to a first embodiment of such a recess, it is provided that the radially outer side wall of the respective ring groove is chamfered radially outwardly towards the separating plane of the adjacent housing parts to form an annular continuous recess. This continuous circumferential recess thus has a contour of triangular cross-section, and is arranged radially adjacent to the ring bead of the diaphragm at the separating plane of the housing parts.

In a second embodiment of such a recess, it is provided that the radially outer side wall and/or the radially inner side wall of the respective ring groove is configured with an oversize or undersize to form a partially interrupted recess, and is provided with axial webs evenly distributed circumferentially and protruding radially into the ring groove. The ring bead of the respective diaphragm is thus clamped radially between the axial webs, whereby the displaced bead material is pressed circumferentially into the respective portions of the recess.

In order to achieve as even a clamping of the ring bead of the respective diaphragm as possible, when arranged radially on both sides, the axial webs are preferably arranged circumferentially offset to each other on the radially outer side wall and the radially inner side wall of the ring groove.

In a third embodiment of such a recess, it is provided that the radial side walls and the groove base of the respective ring groove are arranged in the housing part on the pilot valve side, that the radial side walls of the ring groove and the corresponding outer walls of the ring bead of the diaphragm concerned slope axially convergently in the direction of the housing part on the pilot valve side, and that the axial depth of the ring groove exceeds the axial height of the ring bead to form an annular continuous recess. This continuous circumferential recess therefore has a contour of trapezoid cross-section, and is arranged on the groove base of the ring groove axially adjacent to the ring bead of the diaphragm.

In said three embodiments, an additional recess to receive displaced bead material may be formed in that the housing part facing away from the pilot valves has an edge groove with a single step, the radially inner groove portion of which holds a supporting disk for the diaphragm concerned, and the radially outer groove portion of which radially surrounds the housing part on the pilot valve side close to the ring groove, enclosing an additional annular continuous recess. This additional continuous circumferential recess has a contour of largely rectangular cross-section, and is arranged adjacent to the ring bead of the diaphragm in the corner of the outer groove portion of the edge groove.

In a fourth embodiment of such a recess, it is provided that each housing part facing away from the pilot valves has an edge groove with a single step, the radially inner groove portion of which holds a supporting disk for the diaphragm concerned, and the radially outer groove portion of which surrounds the ring bead of the diaphragm axially and radially on one side, and because of a height of the radial side wall of the inner groove portion which is less than the thickness of the supporting disk, delimits an annular continuous recess. This continuous circumferential recess has a contour of largely rectangular cross-section, and is arranged axially adjacent to the ring bead of the diaphragm between the corner of the outer groove portion of the edge groove and the radial outer edge of the supporting disk.

In a fifth embodiment of such a recess, it is provided that each housing part facing away from the pilot valves has a stepped edge groove, the radially inner groove portion of which receives flushly a supporting disk for the diaphragm, and the adjacent radially outer groove portion of which surrounds the ring bead of the diaphragm axially and radially on one side and delimits an annular continuous radial recess. This continuous circumferential recess therefore has a contour of largely rectangular cross-section, and is arranged radially adjacent to the ring bead of the diaphragm in the corner of the adjacent groove portion of the edge groove.

To produce the continuous circumferential recess, it may be provided that the edge groove has a single step and that the annular continuous radial recess is formed by a radial groove, produced for example by turning, which is arranged in the radial side wall of the radially outer groove portion of the edge groove.

Alternatively, the continuous circumferential recess may also be produced in that the edge groove has two steps, and that the annular continuous radial recess is formed by a cylindrical ring placed in the radially outer groove portion of the edge groove which protrudes radially inwardly over the radial side wall of the middle groove portion of the edge groove.

To reinforce the clamping of the diaphragms and prevent displacement of bead material radially inwards, i.e. into the flow channel or control chamber of the respective diaphragm valve, the housing part on the pilot valve side adjacent to the radially inner side wall of the respective ring groove may, in all said embodiments, be provided with an annular clamping web rising axially towards the ring groove and wedge-shaped in cross-section.

To further explain the invention, drawings of several exemplary embodiments are attached to the description.

The drawings are provided herewith for purely illustrative purposes and are not intended to limit the scope of the present invention.

DETAILED DESCRIPTION OF THE DRAWINGS

Figure 8:
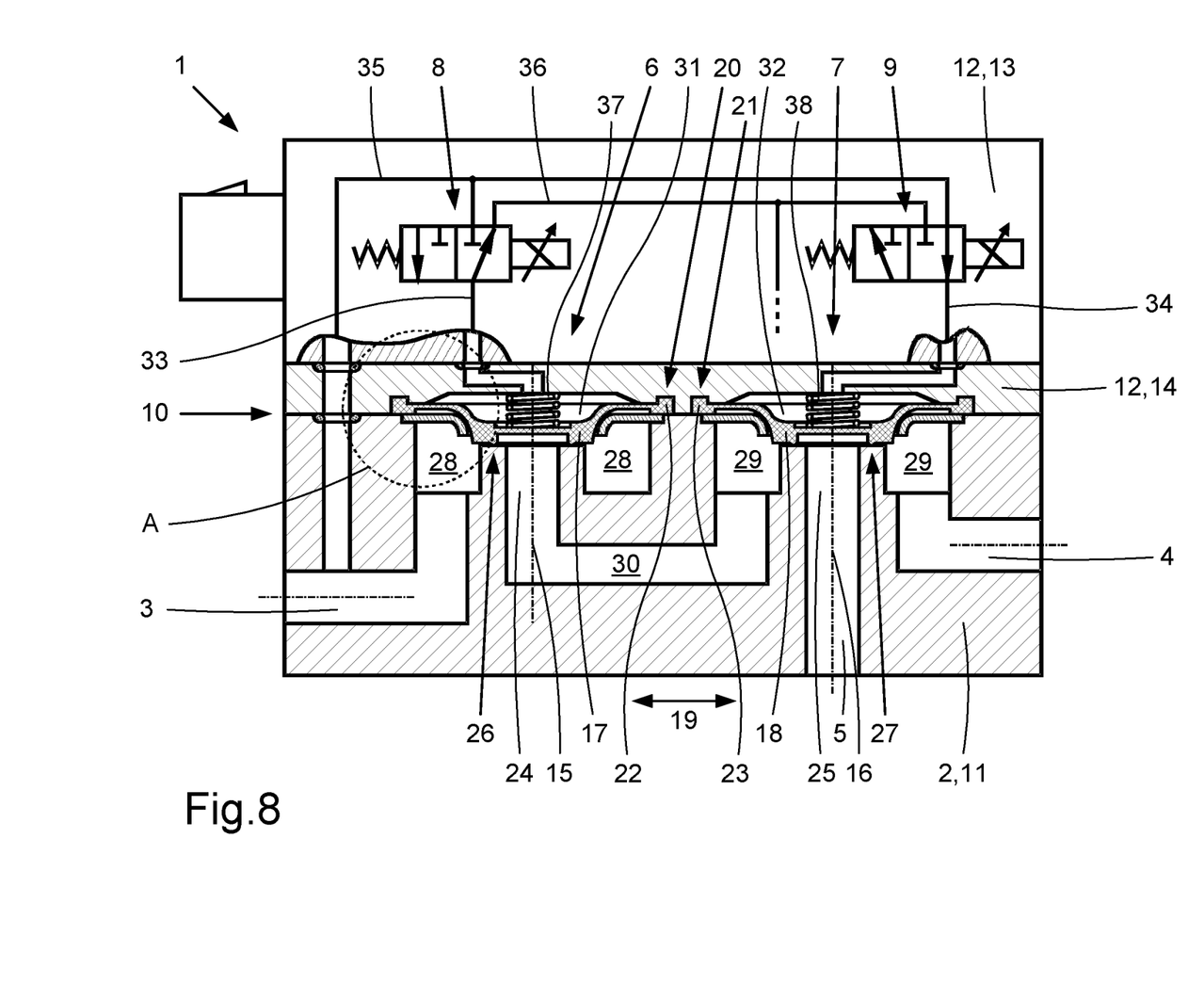
FIG. 8 shows in a vertical longitudinal section, a first embodiment of a valve unit comprising two diaphragm valves.

A first embodiment of a valve unit 1 (largely known) is shown in a vertical longitudinal section in FIG. 8. A brake pressure input 3, a brake pressure output 4, a vent output 5, an inlet valve 6 configured as a diaphragm valve, an outlet valve 7 configured as a diaphragm valve, and a pilot valve 8, 9 configured as a 3/2-way solenoid valve for each diaphragm valve 6, 7, are arranged in an elongate valve housing 2. The valve housing 2 is divided into a base housing 11 and a housing cover 12 by a separating plane 10 which is largely horizontal in the installation position. The housing cover 12 comprises a control unit 13 containing the solenoid valves 8, 9, and an intermediate plate 14 arranged between the base housing 11 and the control unit 13. The control unit 13 and the intermediate plate 14 may be screwed, locked or otherwise connected together. The resulting housing cover 12 may be connected, in particular bolted, uniformly to the base housing 11. It is however also possible that the control unit 13 and intermediate plate 14 are connected separately to the base housing.

Figure 1:
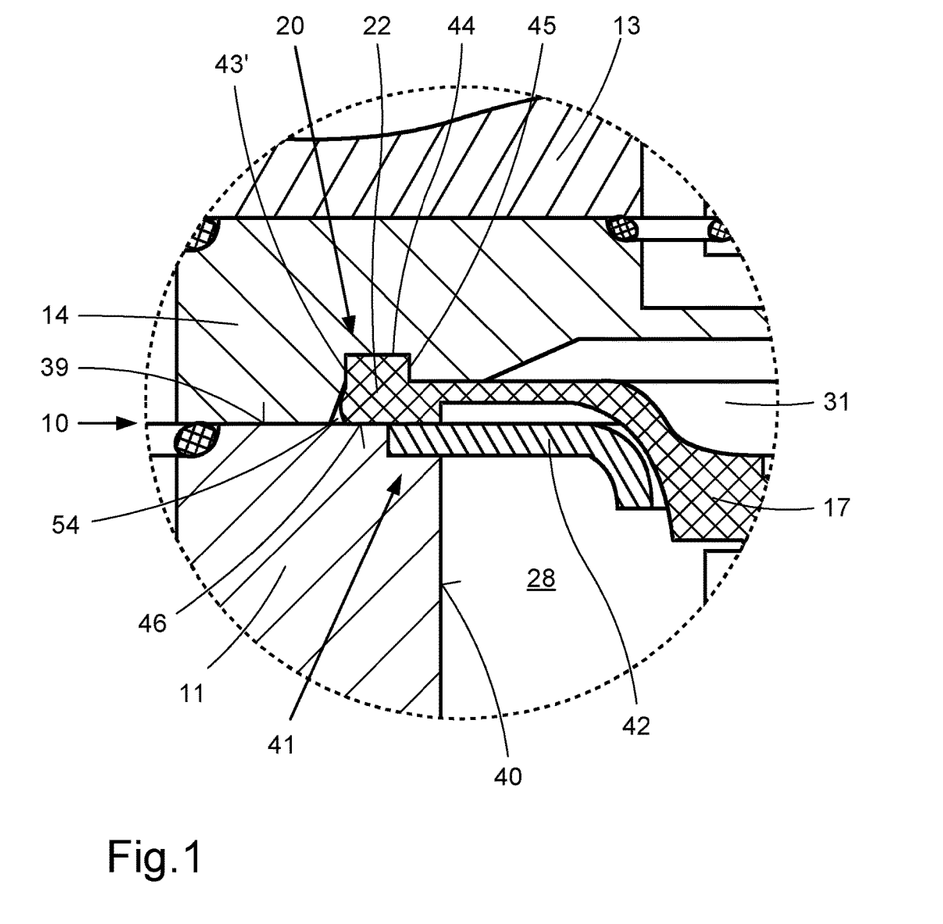
FIG. 1 shows in an enlarged extract, a first embodiment for fixing the diaphragm of a diaphragm valve.

The brake pressure input 3 and brake pressure output 4 are arranged largely axially opposite each other in the longitudinal direction 19 of the valve housing 2 and with horizontal orientation, and the vent output 5 is arranged between them in the base housing 11 and oriented vertically downward. The two diaphragm valves 6, 7 are arranged successively in the longitudinal direction 19 in the base housing 11 between the brake pressure input 3 and the brake pressure output 4, and with parallel actuation axes 15, 16. The diaphragms 17, 18 of the diaphragm valves 6, 7 are arranged in a common diaphragm plane, largely corresponding to the separating plane 10 between the base housing 11 and the intermediate plate 14, and clamped between the base housing 11 and the intermediate plate 14 via a respective ring bead 22, 23 laid in a housing-side ring groove 20, 21 and oriented axially on the pilot valve side. The pilot valves 8, 9, indicated merely diagrammatically in FIG. 1, are arranged entirely in the control unit 13 of the housing cover 12.

Inside the base housing 11 and coaxially to the actuation axes 15, 16, the diaphragm valves 6, 7 each have a cylindrical central channel 24, 25 with a circular valve seat 26, 27 facing the respective diaphragm 17, 18, and a radially outer ring channel 28, 29 arranged concentrically thereto. The ring channel 28 of the inlet valve 6 is directly connected to the brake pressure input 3. The central channel 24 of the inlet valve 6 is connected via a connecting channel 30 to the ring channel 29 of the outlet valve 7, which in turn is connected directly to the brake pressure output 4. The central channel 25 of the outlet valve 7 is connected directly to the vent output 5.

On the outside of the diaphragms 17, 18 axially facing the housing cover 12, a respective control chamber 31, 32 is formed, into each of which a control pressure line 33, 34 opens centrally. Via the control pressure lines 33, 34, the control chambers 31, 32 of the diaphragm valves 6, 7 can be pressurized by the respective assigned pilot valve 8, 9 alternately with a high control pressure, taken from the brake pressure input 3 via a control pressure line 35, or with a low control pressure, corresponding to ambient pressure and taken from the vent output 5 or another point via a control pressure line 36.

Valve springs 37, 38 arranged in each control chamber 31, 32 press the respective diaphragms 17, 18 against the assigned valve seat 26, 27 in the load-free rest state of the valve unit 1, which corresponds to the closed state of the diaphragm valves 6, 7. When the respective control chamber 31, 32 is pressurized with the high control pressure, the respective diaphragm 17, 18 is pressed onto the assigned valve seat 26, 27, whereby the diaphragm valve 6, 7 concerned is closed and can be loaded. When the respective control chamber 31, 32 is pressurized with the low control pressure, the respective diaphragm 17, 18 can be pressed away from the valve seat 26, 27 by the brake pressure present in the adjacent flow channels 24, 28; 25, 29, whereby the diaphragm valve 6, 7 concerned is opened.

The valve unit 1 has the switch functions "Increase pressure", "Maintain pressure" and "Reduce pressure". In the switch function "Increase pressure", the inlet valve 6 is opened and the outlet valve 7 is closed, so that the brake pressure set via a brake valve or a relay valve at the brake pressure input 3 is conducted unchanged to the brake pressure output 4 and the brake circuit or wheel brake cylinder connected thereto. Since the switch function "Increase pressure" corresponds to the rest state of the valve unit 1, the pilot valve 8 connects the inlet valve 6—with its magnetic coil in unpowered state, the control chamber 31 of the inlet valve 6—to the control pressure line 36 conducting the low control pressure. Similarly, the pilot valve 9 of the outlet valve 7—with its magnetic coil in unpowered state, the control chamber 32 of the outlet valve 7—to the control pressure line 35 conducting the high control pressure.

In the switch function "Maintain pressure" of the valve unit 1, the inlet valve 6 and the outlet valve 7 are closed, so that the brake pressure present at the brake pressure output 4 and the wheel brake cylinder or brake circuit connected thereto is held constant. To set this switch function, only the pilot valve 8 of the inlet valve 6 is switched by powering its magnetic coil, and hence the control chamber 31 of the inlet valve 6 is pressurized with the high control pressure.

In the switch function "Reduce pressure" of the valve unit 1, the inlet valve 6 is closed and the outlet valve 7 opened, so that the brake pressure output 4 and the wheel brake cylinder or brake circuit connected thereto can be vented. To set this switch function, both pilot valves 8, 9 are switched by powering their magnetic coils, and hence the control chamber 31 of the inlet valve 6 is pressurized with the high control pressure, and the control chamber 32 of the outlet valve 7 is pressurized with the low control pressure.

The switch functions "Maintain pressure" and "Reduce pressure" of the valve unit 1 are also anti-lock functions with which, when the valve unit 1 is used as an ABS control valve, an anti-lock system can prevent a braking-induced locking of the assigned wheel. The anti-lock functions are controlled by corresponding actuation of the pilot valves by an ABS control unit, in that the signals from wheel speed sensors are analyzed to detect an impending or existing locking of the braked wheels.

Figure 8A:
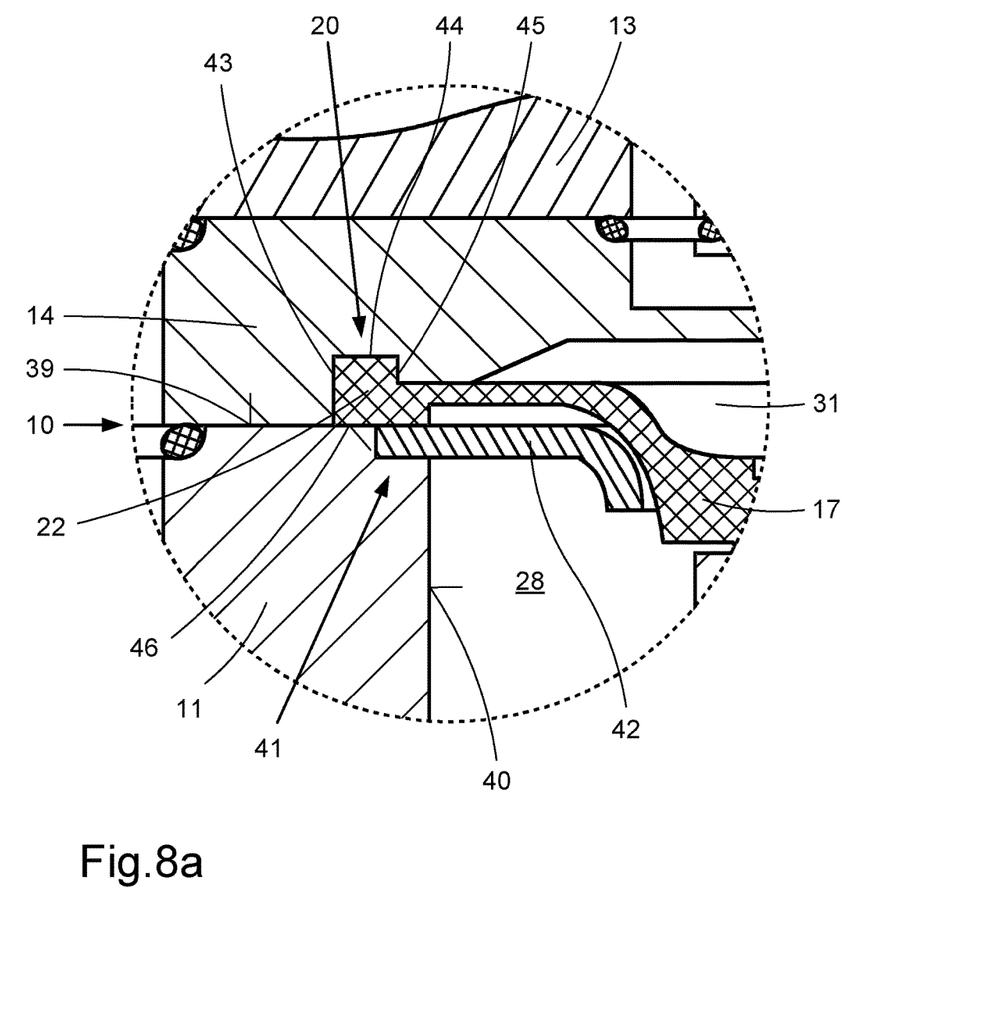
FIG. 8a shows in an enlarged extract, the first embodiment of the valve unit from FIG. 8.

The extract A from FIG. 8, shown in enlarged scale in FIG. 8a, clearly shows that at the transition between the outer wall 39 lying in the separating plane 10 and the radially outer inner wall 40 of the ring channel 28, the base housing 11 comprises a single edge groove 41 in which a support disk 42 of the diaphragm 17 concerned is placed. The ring groove 20 receiving the ring bead 22 of the diaphragm 17 is entirely arranged in the intermediate plate 14 and delimited by a radially outer side wall 43, an axial groove base 44 and a radially inner side wall 45. The separating plane 10 between the base housing 11 and the intermediate plate 14 terminates at the base housing 11 axially flush with the support disk 42, and at the intermediate plate 14 axially flush with the outer edge 46 of the diaphragm 17.

Figure 9:
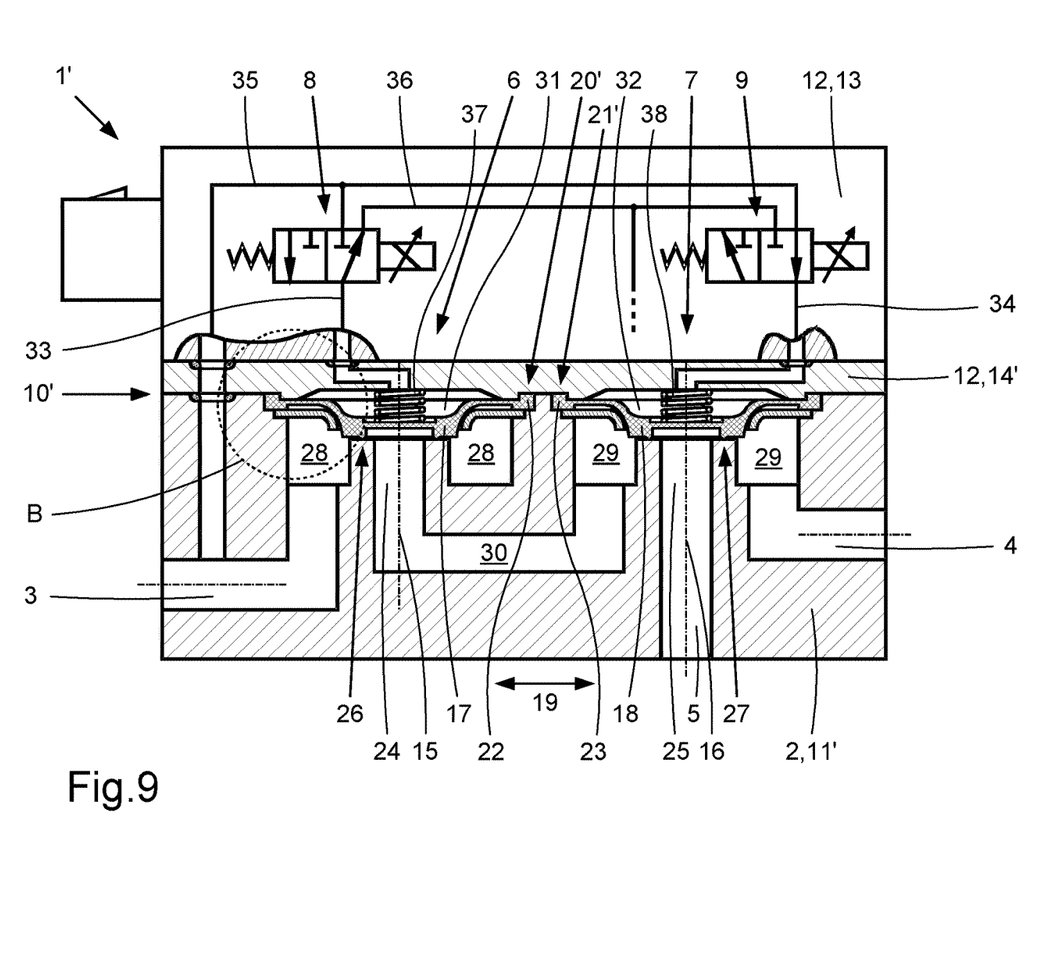
FIG. 9 shows in a vertical longitudinal section, a second embodiment of a valve unit comprising two diaphragm valves.

A second embodiment of a valve unit 1' (largely known), depicted in a vertical longitudinal section in FIG. 9, differs from the first embodiment of the valve unit 1 shown in FIG. 8, with the same structure and same function in principle, by an axially offset position of the separating plane 10' between the base housing 11' and the intermediate plate 14'.

Figure 9A:
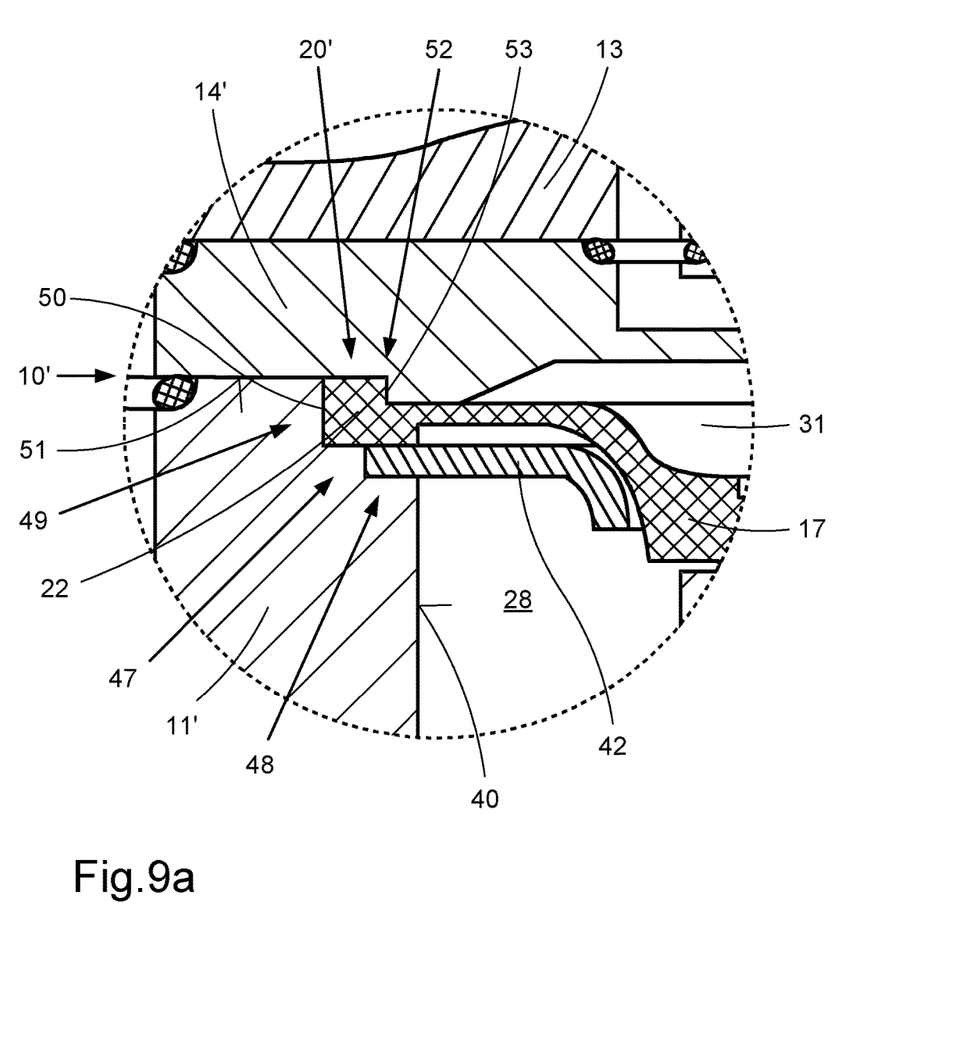
FIG. 9a shows in an enlarged extract, the second embodiment of the valve unit from FIG. 9.

The extract B from FIG. 9, shown in enlarged scale in FIG. 9a, clearly shows that at the transition between the separating plane 10' and the radially outer inner wall 40 of the ring channel 28, the base housing 11' now has an edge groove 47 with a single step, the radially inner groove portion 48 of which holds a supporting disk 42 of the diaphragm 17 concerned. The ring groove 20' receiving the ring bead 22 of the diaphragm 17 is now delimited radially outwardly by the radial side wall 50 of the outer groove portion 49 of the edge groove 47, and furthermore axially on the pilot valve side by the outer wall 51 of the intermediate plate 14' lying in the separating plane 10', and also radially inwardly by a radial side wall 53 of the intermediate plate 14' formed by an axial shoulder 52.

Since the ring beads 22, 23 of the diaphragms 17, 18 usually have a slight oversize relative to the ring grooves 20, 21; 20', 21', which are stationary in relation to the housing, the bead material of the diaphragms 17, 18 is displaced radially inwardly by the clamping between the base housing 11, 11' and the intermediate plate 14, 14', which leads to local thickening and bulging of the diaphragms 17, 18. As well as possible function disruption of the diaphragm valves 6, 7, these usually irregular deformations can also lead to tearing of the diaphragms 17, 18 and hence to premature failure of the diaphragm valves 6, 7.

To avoid damaging the diaphragms 17, 18 by clamping their ring beads 22, 23, it is provided according to the invention that an annular continuous or partially interrupted recess is arranged or formed in the ring groove 20, 21; 20', 21' or immediately adjacent to the ring groove 20, 21; 20', 21' of at least one diaphragm valve 6, 7, to receive displaced bead material from the diaphragm 17, 18 concerned. FIGS. 1 to 7a described below depict various embodiments of such recesses, in each case in enlarged extracts of vertical longitudinal sections of the valve unit 1, 1', and FIG. 2b depicts as an extract an axial view of the intermediate plate 14.

In a first embodiment according to FIG. 1, the radially outer side wall 43' of the ring groove 20 is configured chamfered radially outwardly towards the separating plane 10 of the adjacent housing parts 11, 14, to form an annular continuous recess 54. The resulting continuous circumferential recess 54 accordingly has a contour which is wedge-shaped in cross-section.

Figure 2A:
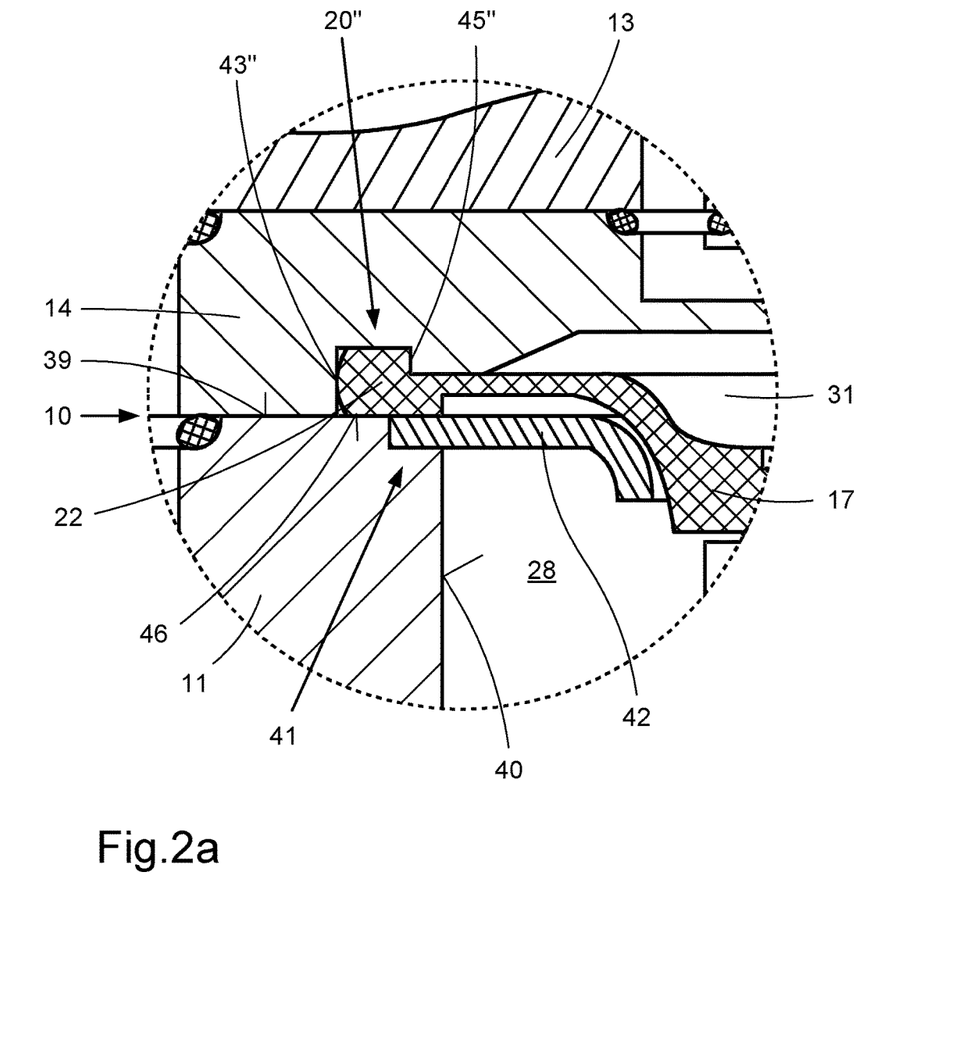
FIG. 2a shows in an enlarged extract, a second embodiment for fixing the diaphragm of a diaphragm valve.
Figure 2B:
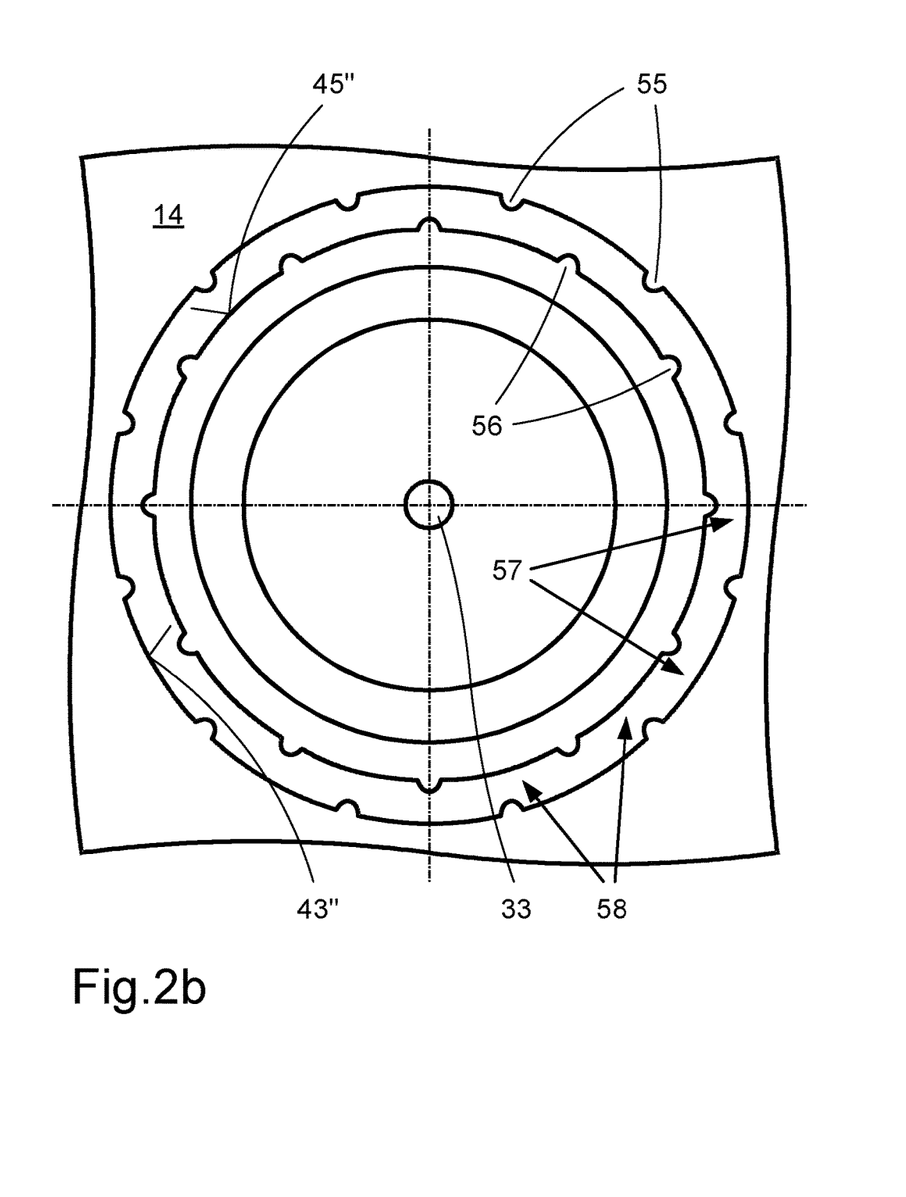
FIG. 2b shows an extracted, axial view of an intermediate plate of a valve unit in the region of a diaphragm valve with the second embodiment for fixing the diaphragm according to FIG. 2a, FIG. 3 shows in an enlarged extract, a refinement of the second embodiment for fixing the diaphragm of a diaphragm valve according to FIG. 2a and FIG. 2b.

In a second embodiment according to FIGS. 2a and 2b, the radially outer side wall 43" and the radially inner side wall 45" of the ring groove 20" are configured with an oversize or undersize respectively, to form a partially interrupted recess 57, 58, and are provided with axial webs 55, 56 distributed evenly circumferentially and protruding radially into the ring groove 20". As the axial view of FIG. 2b shows, the axial webs 55, 56 are arranged offset to each other circumferentially on the radially outer side wall 43" and the radially inner side wall 45" of the ring groove 20".

Figure 3:
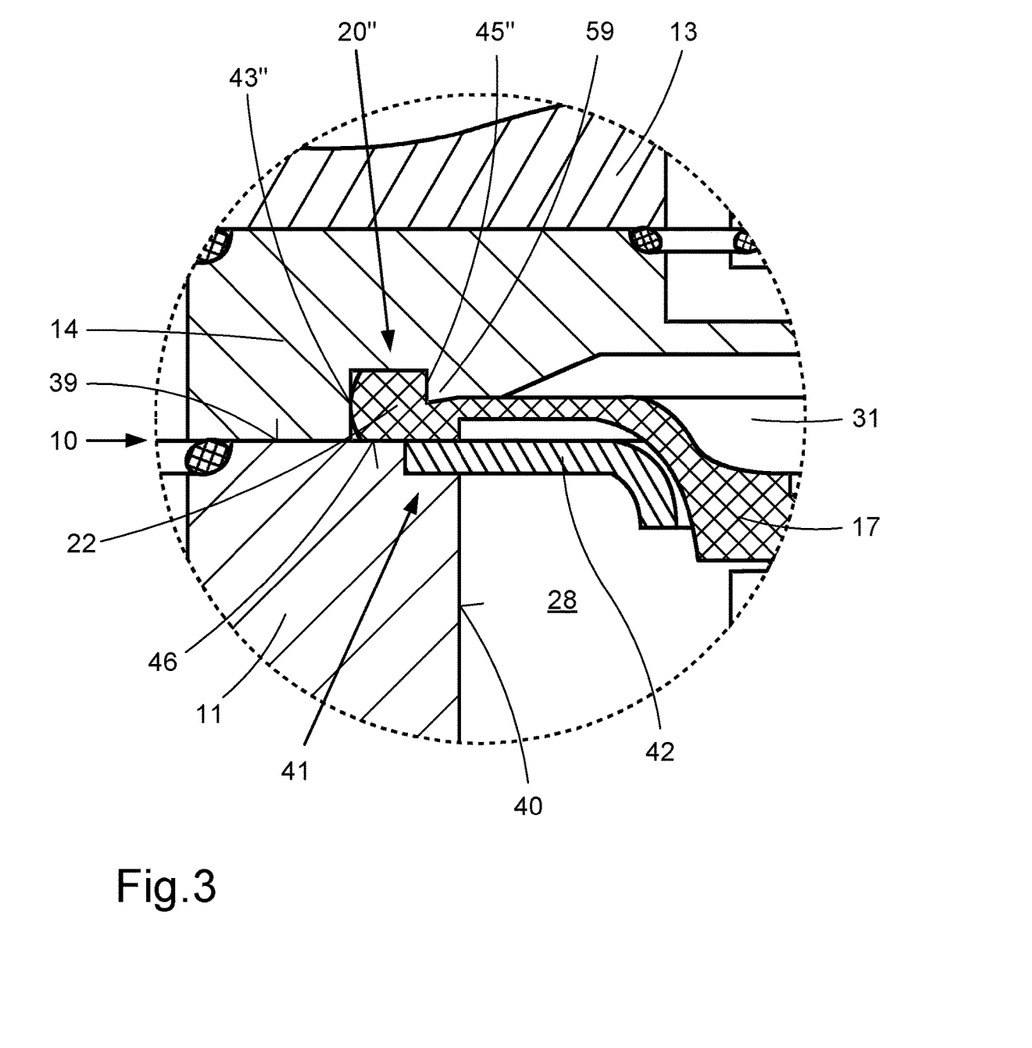

In an exemplary refinement of the second embodiment according to FIG. 3, the intermediate plate 14 adjacent to the radially inner side wall 45" of the ring groove 20" is provided with an annular clamping web 59 rising axially towards the ring groove 20" and wedge-shaped in cross-section. Due to the formation and arrangement of the clamping web 59—which may be used in all embodiments—the clamping of the diaphragm 17 between the housing parts 11, 14 is reinforced and a displacement of bead material radially inwardly, i.e. into the adjacent ring channel 28 or the adjacent control chamber 31 of the diaphragm valve 6, is prevented.

Figure 4:
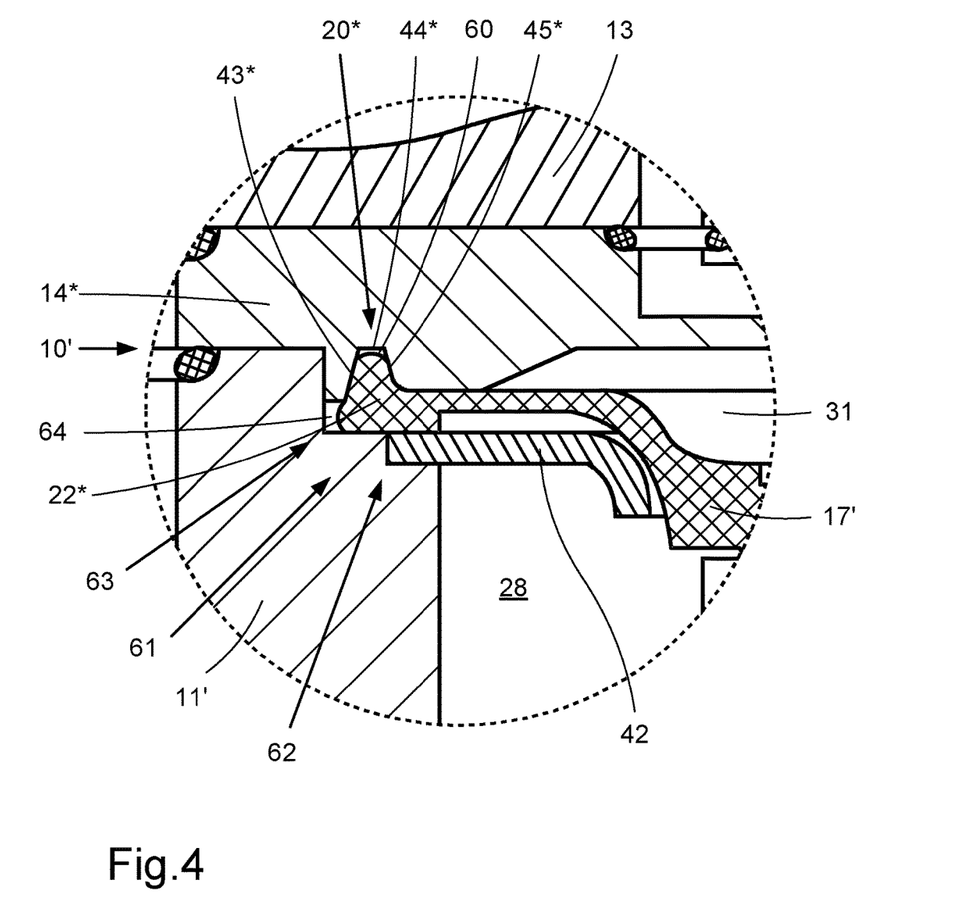
FIG. 4 shows in an enlarged extract, a third embodiment for fixing the diaphragm of a diaphragm valve.

In a third embodiment according to FIG. 4, the radial side walls 43*, 45* and the groove base 44* of the ring groove 20* are arranged in the intermediate plate 14*. The radial side walls 43*, 45* of the ring groove 20* and the corresponding outer walls of the ring bead 22* of the diaphragm 17' slope axially convergently in the direction towards the intermediate plate 14*. To form an annular continuous recess 60, the axial depth of the ring groove 20* exceeds the axial height of the ring bead 22* of the diaphragm 17'. Due to the wedge-shaped form of the ring groove 20* and the ring bead 22*, the clamping of the diaphragm 17' between the housing parts 11', 14* is reinforced and surplus bead material of the diaphragm 17' is pressed into the floor-side recess 60.

To form an additional continuous circumferential recess 64 to receive bead material of the diaphragm 17', as an example, in the embodiment according to FIG. 4, it is provided that the base housing 11' has an edge groove 61 with a single step, the radially inner groove portion 62 of which holds the supporting disk 42 of the diaphragm 17', and the radially outer groove portion 63 of which radially surrounds an axial portion of the intermediate plate 14* close to the ring groove 20*, axially enclosing the additional annular continuous recess 64. With a corresponding shift of the separating plane 10 between the two housing parts 11, 14, the additional continuous circumferential recess 64 may also be provided in the above-mentioned embodiments according to FIGS. 1 to 3.

Figure 5:
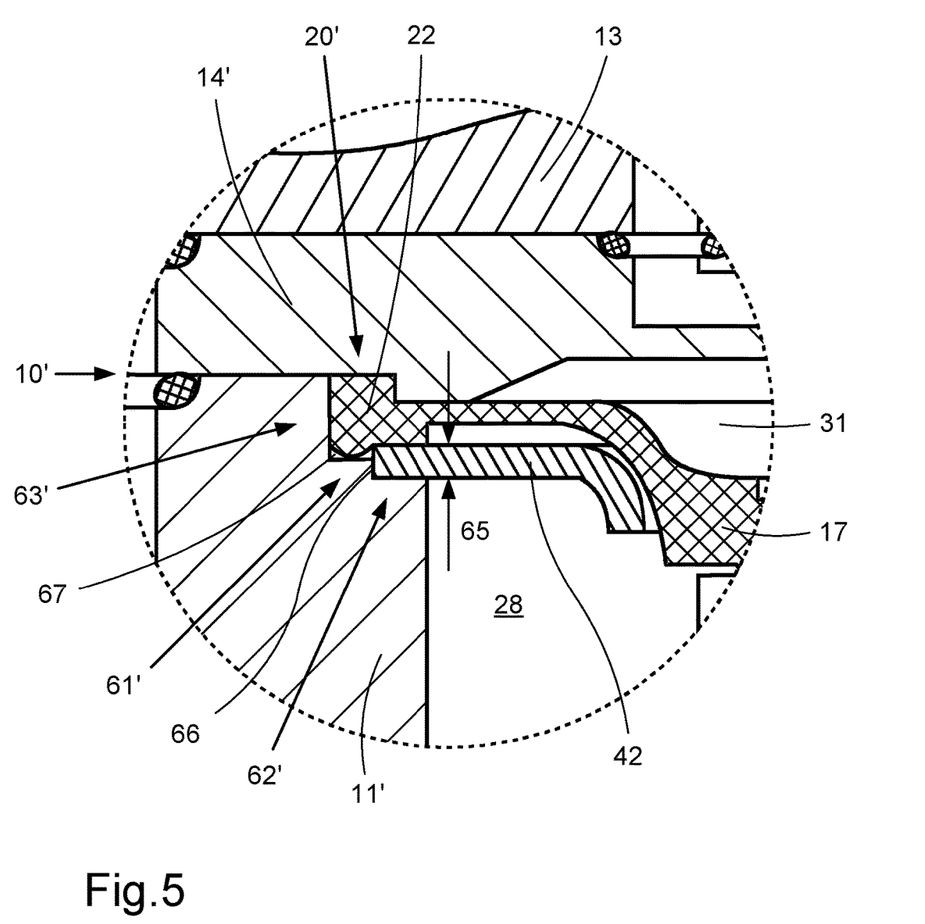
FIG. 5 shows in an enlarged extract, a fourth embodiment for fixing the diaphragm of a diaphragm valve.

In a fourth embodiment according to FIG. 5, the base housing 11' also has an edge groove 61' with a single step, the radially inner groove portion 62' of which holds the supporting disk 42 of the diaphragm 17, and the radially outer groove portion 63' of which encloses the ring bead 22 of the diaphragm 17 axially and radially on one side, and because of a height of the radial side walls 66 of the inner groove portion 62' which is less than the thickness 65 of the supporting disk 42, delimits an annular continuous recess 67. The continuous circumferential recess 67 thus produced consequently has a contour of rectangular cross-section.

Figure 6:
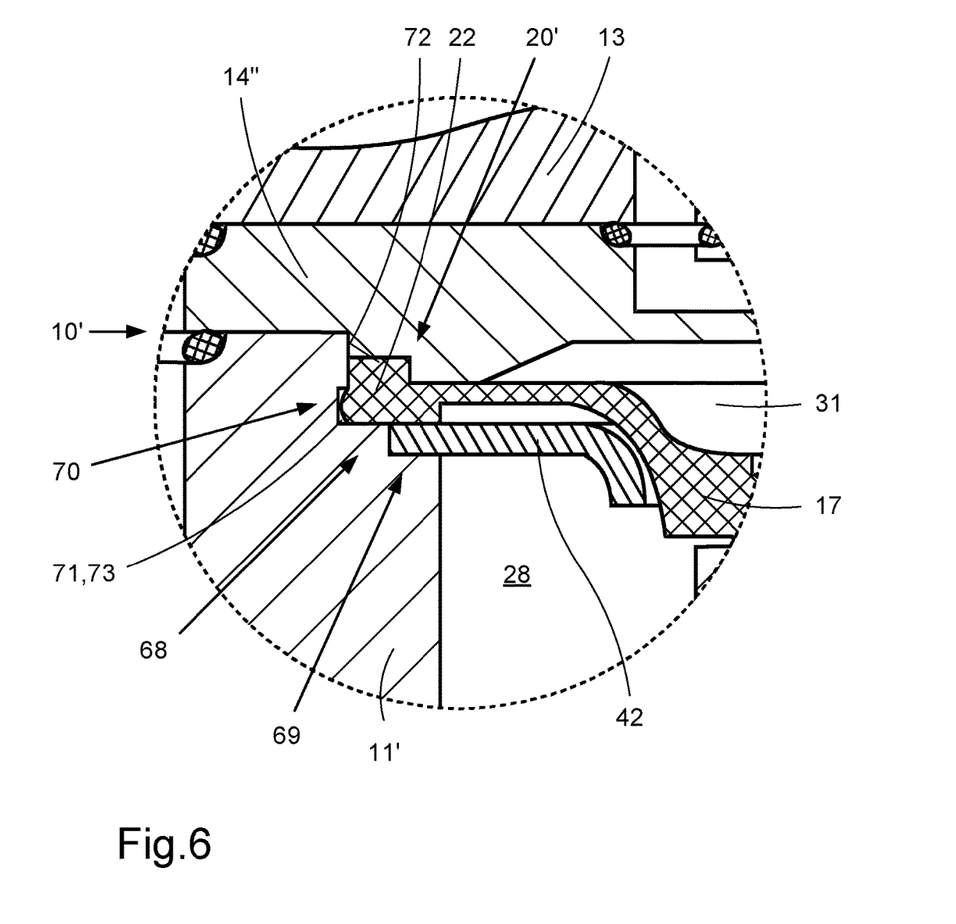
FIG. 6 shows in an enlarged extract, a first variant of a fifth embodiment for fixing the diaphragm of a diaphragm valve.
Figure 7:
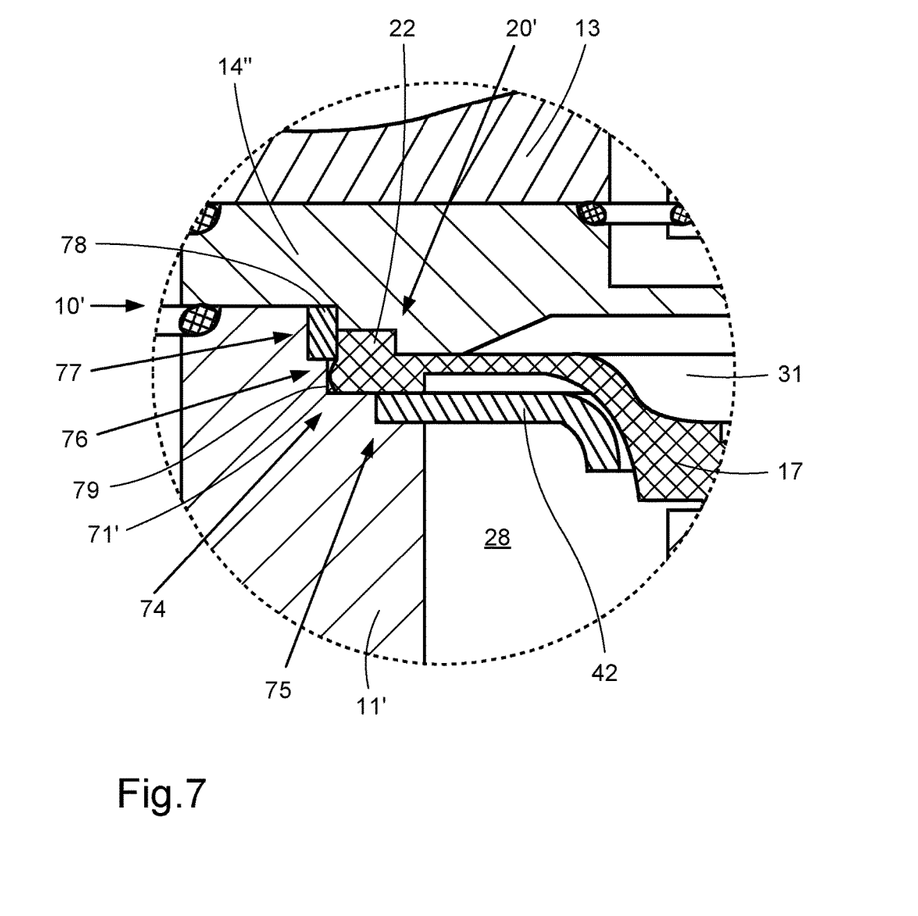
FIG. 7 shows in an enlarged extract, a second variant of the fifth embodiment for fixing the diaphragm of a diaphragm valve.

In a fifth embodiment shown in a first variant in FIG. 6, and in a second variant in FIG. 7, it is provided that the base housing 11' has a stepped edge groove 68, 74, the radially inner groove portion 69, 75 of which receives flushly the supporting disk 42 of the diaphragm 17, and the adjacent radially outer groove portion 70, 76 of which encloses the ring bead 22 of the diaphragm 17 axially and radially on one side, and delimits an annular continuous radial recess 71, 71'.

In the first variant according to FIG. 6, the edge groove 68 of the base housing 11' has a single step, and the annular continuous radial recess 71 is formed by a radial groove 73 arranged in the side wall 72 of the radially outer groove portion 70 of the edge groove 68. The radial groove 73 may for example be produced by turning.

In the second variant according to FIG. 7, the edge groove 74 of the base housing 11' has two steps, and the annular continuous radial recess 71' is formed in that a cylindrical ring 78 is laid in the radially outer groove portion 77 of the edge groove 74 which protrudes radially inwardly over the radial side wall 79 of the middle groove portion 76 of the edge groove 74. In comparison with the previous variant, the continuous circumferential recess 71' is now easier to produce, but because of the necessary ring 78 has the disadvantage of an additional component.

While the above description constitutes the preferred embodiments of the present invention, it will be appreciated that the invention is susceptible to modification, variation and change without departing from the proper scope and fair meaning of the accompanying claims.

The invention claimed is:

1. A valve unit for modulating pressure in a compressed-air brake system, the valve unit comprising:
an inlet valve (6) and an outlet valve (7), the inlet valve and the outlet valve being configured as diaphragm valves, each of the diaphragm valves having a diaphragm (17, 18),
a brake pressure output (4) configured to be connected to or shut off from a brake pressure input (3) or a vent output (5),
two pilot valves (8, 9) configured as 3/2-way solenoid valves,
a respective control chamber (31, 32) adjacent to the diaphragm (17, 18) of each of the diaphragm valves (6, 7), the control chamber (31, 32) being configured to be pressurized with a control pressure via a control pressure line (33, 34),
wherein the diaphragm valves (6, 7) are arranged with parallel actuation axes (15, 16) and radially adjacent to each other in a valve housing (2), and the diaphragms (17, 18) of the diaphragm valves (6, 7) are each clamped between two housing parts (11, 14; 11', 14') via a respective ring bead (22, 23) placed in a housing-side ring groove (20, 21; 20', 21') and oriented axially on a pilot valve side,
wherein an annular continuous recess (54, 60, 64, 67, 71, 71') or a partially interrupted recess is arranged in the ring groove (20, 21; 20', 21) or immediately adjacent to the ring groove (20, 21; 20', 21') of at least one of the diaphragm valves (6, 7) to receive displaced bead material from the diaphragm (17, 18),
wherein at least one of a radially outer side wall (43") and a radially inner side wall (45") of the ring groove (20") is configured with an oversize or undersize and with axial webs (55, 56) evenly distributed circumferentially and protruding radially into the ring groove (20") to form the partially interrupted recess (57, 58).

2. The valve unit as claimed in claim 1, wherein a radially outer side wall (43') of the ring groove (20) is chamfered radially outwardly towards a separating plane (10) of the adjacent housing parts (11, 14) to form the annular continuous recess (54).

3. The valve unit as claimed in claim 2, wherein the housing part (11') facing away from the pilot valves (8, 9) has an edge groove (61) with a single step, the edge groove (61) having a radially inner groove portion (62) holding a supporting disk (42) for the diaphragm (17'), and the edge groove (61) having a radially outer groove portion (63) radially surrounding the housing part (14*) on the pilot valve side close to the ring groove (20*) and enclosing an additional annular continuous recess (64).

4. The valve unit as claimed in claim 1, wherein the axial webs (55, 56) are arranged on radially opposite sides of the ring groove (20") and circumferentially offset on the radially outer side wall (43") with respect to the axial webs (55, 56) on the radially inner side wall (45") of the ring groove (20").

5. The valve unit as claimed in claim 1, wherein the housing part (14) on the pilot valve side and adjacent to the radially inner side wall (45") of the ring groove (20") includes an annular clamping web (59) rising axially towards the ring groove (20") and wedge-shaped in cross-section.

6. A valve unit for modulating pressure in a compressed-air brake system, the valve unit comprising:
an inlet valve (6) and an outlet valve (7), the inlet valve and the outlet valve being configured as diaphragm valves, each of the diaphragm valves having a diaphragm (17, 18),
a brake pressure output (4) configured to be connected to or shut off from a brake pressure input (3) or a vent output (5),
two pilot valves (8, 9) configured as 3/2-way solenoid valves, a respective control chamber (31, 32) adjacent to the diaphragm (17, 18) of each of the diaphragm valves (6, 7), the control chamber (31, 32) being configured to be pressurized with a control pressure via a control pressure line (33, 34), wherein the diaphragm valves (6, 7) are arranged with parallel actuation axes (15, 16) and radially adjacent to each other in a valve housing (2), and the diaphragms (17, 18) of the diaphragm valves (6, 7) are each clamped between two housing parts (11, 14; 11', 14') via a respective ring bead (22, 23) placed in a housing-side ring groove (20, 21; 20', 21') and oriented axially on a pilot valve side, wherein an annular continuous recess (54, 60, 64, 67, 71, 71') or a partially interrupted recess is arranged in the ring groove (20, 21; 20', 21) or immediately adjacent to the ring groove (20, 21; 20', 21') of at least one of the diaphragm valves (6, 7) to receive displaced bead material from the diaphragm (17, 18), wherein radial side walls (**43\*, 45\*) of the ring groove (20\*) and a groove base (44\*) of the ring groove (20\*) are arranged in the housing part (14\*) on the pilot valve side, wherein the radial side walls (43\*, 45\*) of the ring groove (20\*) and outer walls of the ring bead (22\*) of the diaphragm (17') slope axially convergently in a direction of the housing part (14\*) on the pilot valve side, and wherein an axial depth of the ring groove (20\*) exceeds an axial height of the ring bead (22\*) to form the annular continuous recess (60**).

7. The valve unit as claimed in claim 6, wherein the housing part (11') facing away from the pilot valves (8, 9) has an edge groove (61) with a single step, the edge groove (61) having a radially inner groove portion (62) holding a supporting disk (42) for the diaphragm (17'), and the edge groove (61) having a radially outer groove portion (63) radially surrounding the housing part (14\*) on the pilot valve side close to the ring groove (20\*) and enclosing an additional annular continuous recess (64).

8. A valve unit for modulating pressure in a compressed-air brake system, the valve unit comprising:
an inlet valve (6) and an outlet valve (7), the inlet valve and the outlet valve being configured as diaphragm valves, each of the diaphragm valves having a diaphragm (17, 18),
a brake pressure output (4) configured to be connected to or shut off from a brake pressure input (3) or a vent output (5),
two pilot valves (8, 9) configured as 3/2-way solenoid valves,
a respective control chamber (31, 32) adjacent to the diaphragm (17, 18) of each of the diaphragm valves (6, 7), the control chamber (31, 32) being configured to be pressurized with a control pressure via a control pressure line (33, 34),
wherein the diaphragm valves (6, 7) are arranged with parallel actuation axes (15, 16) and radially adjacent to each other in a valve housing (2), and the diaphragms (17, 18) of the diaphragm valves (6, 7) are each clamped between two housing parts (11, 14; 11', 14') via a respective ring bead (22, 23) placed in a housing-side ring groove (20, 21; 20', 21') and oriented axially on a pilot valve side,
wherein an annular continuous recess (54, 60, 64, 67, 71, 71') or a partially interrupted recess is arranged in the ring groove (20, 21; 20', 21) or immediately adjacent to the ring groove (20, 21; 20', 21') of at least one of the diaphragm valves (6, 7) to receive displaced bead material from the diaphragm (17, 18),
wherein each housing part (11') facing away from the pilot valves (8, 9) has a stepped edge groove (68, 74), the stepped edge groove (68, 74) having a radially inner groove portion (69, 75) receiving flushly a supporting disk (42) for the diaphragm (17), and the stepped edge groove (68, 74) having an adjacent radially outer groove portion (70, 77) enclosing the ring bead (22) of the diaphragm (17) axially and radially on one side and delimiting the annular continuous recess (71, 71').

9. The valve unit as claimed in claim 8, wherein the edge groove (68) has a single step and the annular continuous recess (71) is formed by a radial groove (73) arranged in a radial side wall (72) of the radially outer groove portion (70) of the edge groove (68).

10. The valve unit as claimed in claim 8, wherein the edge groove (74) has two steps, and the annular continuous recess (71') is formed by a cylindrical ring (78) laid in the radially outer groove portion (77) of the edge groove (74), the radially outer groove portion (77) protruding radially inwardly over a radial side wall (79) of a middle groove portion (76) of the edge groove (74).

11. A valve unit for modulating pressure in a compressed-air brake system, the valve unit comprising:
an inlet valve (6) and an outlet valve (7), the inlet valve and the outlet valve being configured as diaphragm valves, each of the diaphragm valves having a diaphragm (17, 18),
a brake pressure output (4) configured to be connected to or shut off from a brake pressure input (3) or a vent output (5),
two pilot valves (8, 9) configured as 3/2-way solenoid valves,
a respective control chamber (31, 32) adjacent to the diaphragm (17, 18) of each of the diaphragm valves (6, 7), the control chamber (31, 32) being configured to be pressurized with a control pressure via a control pressure line (33, 34),
wherein the diaphragm valves (6, 7) are arranged with parallel actuation axes (15, 16) and radially adjacent to each other in a valve housing (2), and the diaphragms (17, 18) of the diaphragm valves (6, 7) are each clamped between two housing parts (11, 14; 11', 14') via a respective ring bead (22, 23) placed in a housing-side ring groove (20, 21; 20', 21') and oriented axially on a pilot valve side,
wherein an annular continuous recess (54, 60, 64, 67, 71, 71') or a partially interrupted recess is arranged in the ring groove (20, 21; 20', 21) or immediately adjacent to the ring groove (20, 21; 20', 21') of at least one of the diaphragm valves (6, 7) to receive displaced bead material from the diaphragm (17, 18),
wherein each housing part (11') facing away from the pilot valves (8, 9) has an edge groove (61') with a single step, the edge groove (61') having a radially inner groove portion (62') holding a supporting disk (42) for the diaphragm (17), and the edge groove (61') having a radially outer groove portion (63') surrounding the ring bead (22) of the diaphragm (17) axially and radially on one side, the inner groove portion (62') having a radial side wall (66) with a height less than a thickness (65) of the supporting disk (42) such that the radially outer groove portion (63') delimits the annular continuous recess (67).

* * * * *